Sept. 6, 1927.  1,641,304
W. A. TRATSCH
COIN CHUTE
Filed March 23, 1925    7 Sheets-Sheet 1

INVENTOR
Walter A. Tratsch
BY
ATTORNEY

Sept. 6, 1927.

W. A. TRATSCH

1,641,304

COIN CHUTE

Filed March 23, 1925

INVENTOR
Walter A. Tratsch
BY
F. A. Witherspoon
ATTORNEY

Sept. 6, 1927.

W. A. TRATSCH

COIN CHUTE

Filed March 23, 1925

INVENTOR
Walter A. Tratsch
BY
F. A. Witherspoon
ATTORNEY

Sept. 6, 1927.  
W. A. TRATSCH  
COIN CHUTE  
Filed March 23, 1925  
1,641,304  
7 Sheets-Sheet 7

INVENTOR  
Walter A. Tratsch  
BY F. A. Witherspoon  
ATTORNEY

Patented Sept. 6, 1927.

1,641,304

UNITED STATES PATENT OFFICE.

WALTER A. TRATSCH, OF CHICAGO, ILLINOIS.

COIN CHUTE.

Application filed March 23, 1925. Serial No. 17,819.

This invention relates to check controlled apparatus and more especially to a coin chute for vending mechanisms and has for its object to provide a construction more efficient in operation than those heretofore proposed.

With these and other objects in view the invention resides in the novel details of construction and combinations of parts more fully hereinafter disclosed and particularly pointed out in the claims.

Referring to the drawings forming a part of this specification in which like numerals designate like parts in all the views.

This invention may be applied to any vending mechanism such, for example, as an electrically operated piano 1, and provides a front cover plate 2 so attached to the vending machine 1 that the said cover may only be removed from said machine by an authorized person. This cover plate 2 is provided with a horizontally disposed slot 3 in which slides the handle 4 by means of which an inserted coin may be pushed into operative position. The cover plate is also provided with a suitable window 5 in the front thereof and a centrally disposed slot 6 at the bottom thereof through which may pass coins of insufficient size, slugs, or other devices not intended to operate the mechanism.

Figures 20, 21, 22, 23, 24:
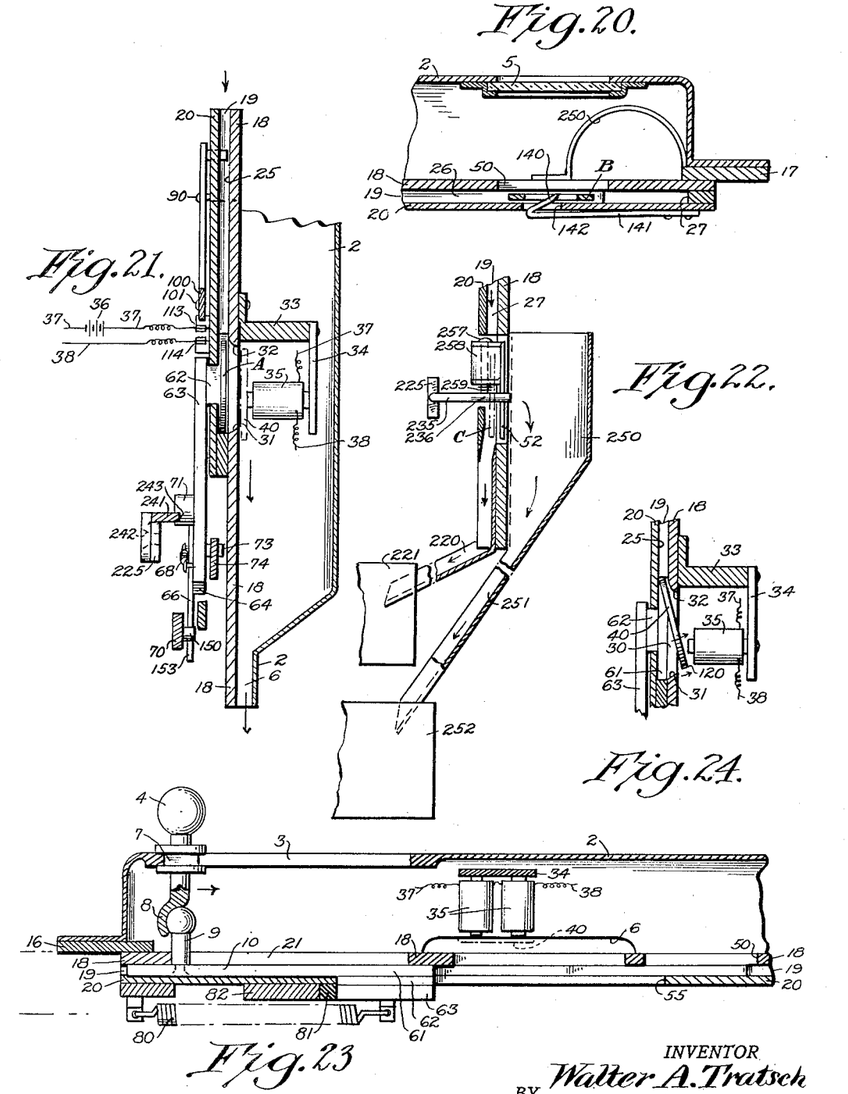
Figure 20 is a sectional view taken on the line 20—20 of Figure 4 with the cover plate attached and looking in the direction of the arrows.
Figure 21 is a vertical sectional view taken on the line 21—21 of Figure 4 and looking in the direction of the arrows.
Figure 22 is a vertical sectional view taken on the line 22—22 of Figure 4 and looking in the direction of the arrows.
Figure 23 is a sectional view taken on the line 23—23 of Figure 4 with the cover plate attached and looking in the direction of the arrows.
Figure 24 is a detail vertical sectional view illustrating the action of the electromagnets to pull a slug from the coin chute.

With special reference to Figure 23 it will be observed that the handle 4 is provided with a squared neck portion 7 adapted to closely fit and operate in the slide 3 of the said cover plate. Beyond the neck portion 7 of the handle 4 is a head 8 suitably formed to contact the end of the operating lever 9 with which the coin actuating slide generally indicated by the numeral 10 is provided. It will be observed in said Figure 23 that when the slide 10 is advanced to the right, as seen in said figure, by the handle 4 and its associated head 8, and said slide retained in its advanced position as will be disclosed later, the said handle 4 may be moved backwardly or to the left as seen in said figure if desired without injury to the actuating lever 9 or the slide 10. In other words, the head 8 of the handle 4 is adapted to move the lever 9 in one direction only.

The top of the piano or other vending machine 1 is provided with a suitable casting 15 associated with the top of the coin receiving chute, and may bear any suitable legend directing the insertion of a coin in the mechanism, as usual.

Figure 1:
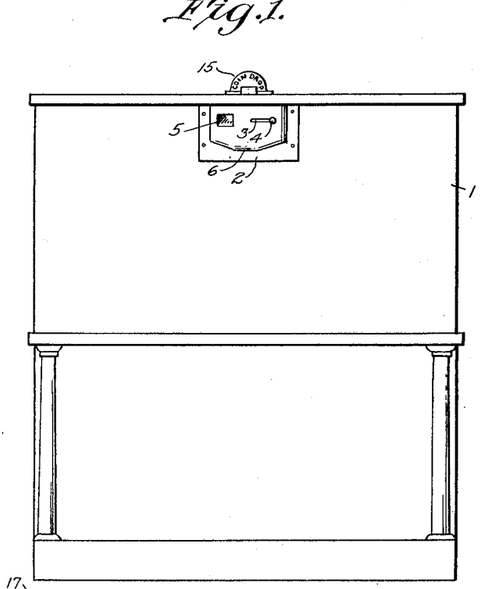
Figure 1 is a front elevational view of a vending apparatus having this invention applied thereto.
Figure 2:
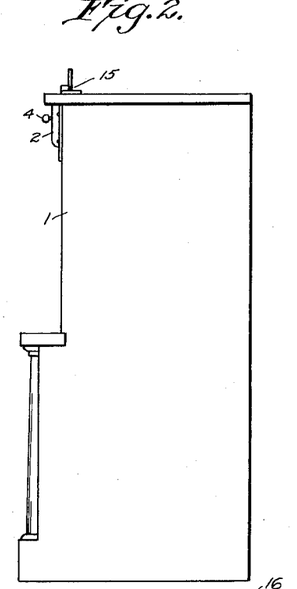
Figure 2 is a side elevational view of the parts shown in Figure 1.
Figure 3:
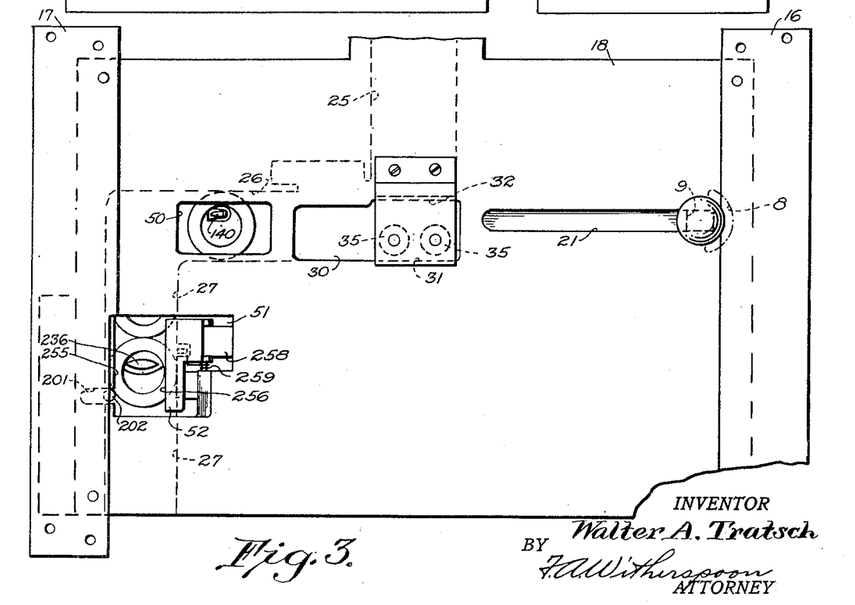
Figure 3 is a detail front elevational view of the invention as seen when the front cover plate has been removed therefrom.

The coin controlling device is suitably attached to the vending machine as by the strips 16 and 17, and comprises a front plate 18, a middle or spacing plate 19 and a rear plate 20, see Figures 3 and 21. The front plate 18 is provided with a longitudinally disposed slot 21 in substantial registry with the slot 3 of the cover plate 2 and in which is adapted to slide the operating lever 9 of the coin actuating slide 10. The front plate 18, spacing plate 19, and rear plate 20 are of such dimensions and shape as to provide the vertical coin receiving slot 25, the horizontally disposed coin passage 26 and the vertical coin delivery chute 27. At the junction of the coin receiving chute 25 and the coin passage 26 there is provided in the front plate 18 an aperture 30, see Figure 3, provided with the downwardly and inwardly bevelled edge 31 and the inwardly rounded upper edge 32. Extending from the plate 18 directly over the aperture 30 is a bracket 33 with a depending plate 34 supporting the electromagnets 35 in registry with the coin receiving chute 25 and the coin passage 26. When these magnets 35 are energized with current from any suitable source 36 over the wires 37 and 38 said magnets will attract any iron or other slug, washer, etc. that was dropped down the chute 25, withdrawing the same from the coin chute. With special reference to Figure 24 it will be seen that as the iron washer, such as 40, approaches the bottom of the chute 25 the energized magnet 35 will attract the same pulling the advancing lower edge outwardly and over the inclined bottom 31 of the aperture 30 so that when the magnets 35 were de-energized the washer 40 would fall through the slot 6 provided in the bottom of the front cover plate 2, dropping entirely out of the mechanism into full view of the persons standing near the vending machine. The energization of the magnet 35 will be disclosed later. The front cover plate 2 is provided with an aperture 50 located substantially in registry with the window 5 of the front cover plate 2, and below said aperture 50 another aperture 51 is provided in the said front plate 18 to give access to the coin delivery chute 27 and the gate 52. All as will be clear from the drawings.

Figure 4:
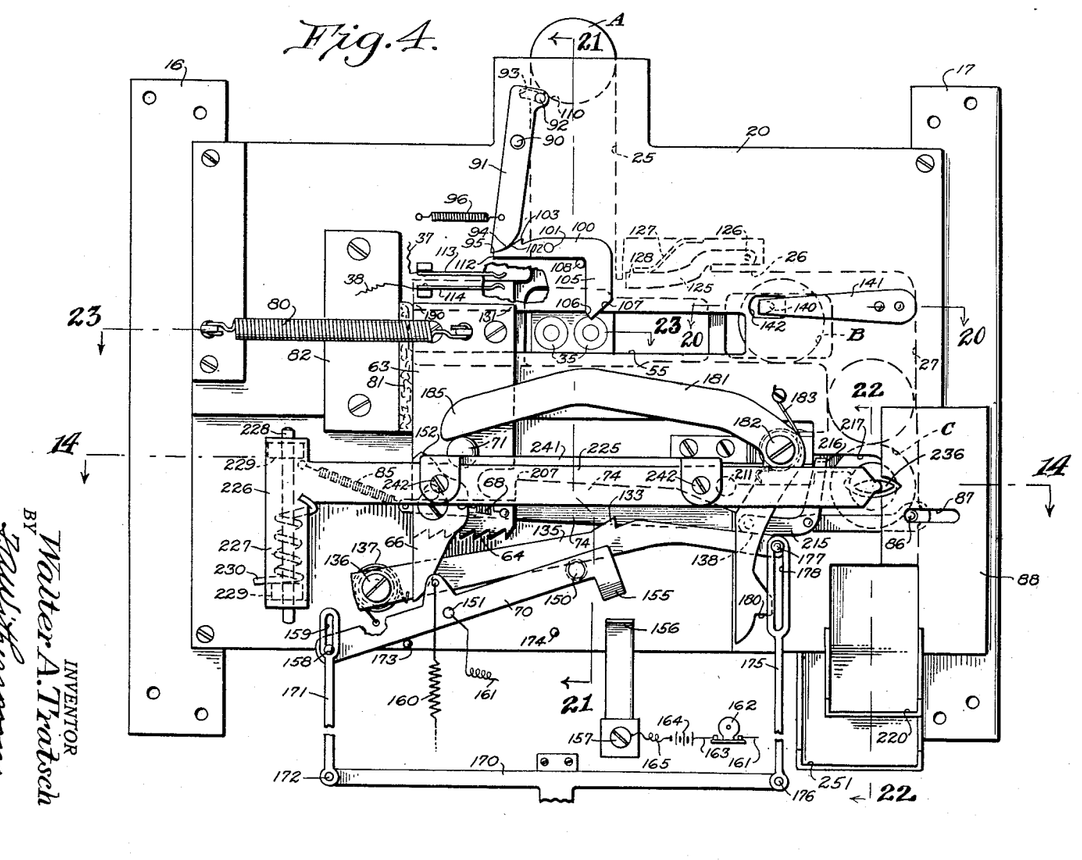
Figure 4 is a rear elevational view of the actuating parts of this invention as seen in normal positions.
Figures 17, 18, 19:
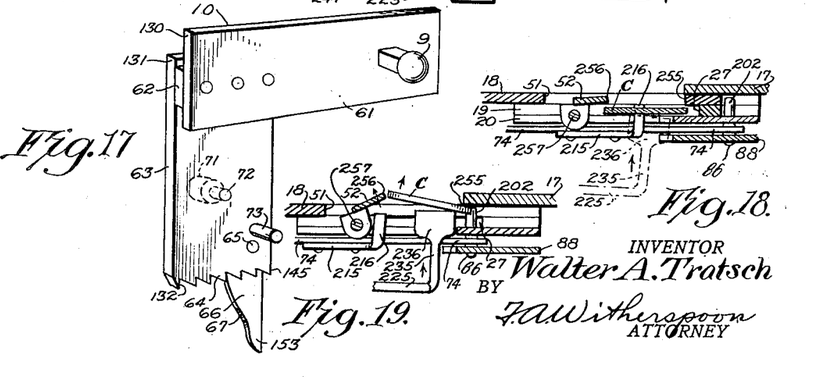
Figure 17 is a perspective view of the coin actuating slide.
Figure 18 is a fragmentary sectional view similar to Figures 15 and 16 and illustrating the movable gate associated with the coin chute in its normal position.
Figure 19 is a view similar to Figure 18 showing the gate opened to permit the passage of a coin therethrough and out of the coin chute.

With particular reference to Figure 4 it will be observed that the rear plate 20 is provided with a longitudinally disposed opening 55 forming the guideway for the coin actuating slide 10, see Figures 4 and 17. This slide comprises the member 61 adapted to closely fit and slide in the coin passage 26 between the front plate 18 and the rear plate 20, near one end of which is securely fastened the operating lever 9 extending through and sliding in the slot 21 provided in the front plate 18. At the other end of the said member 61 is a spacing member 62 adapted to slidingly fit within the aperture 55 in the back plate 20. The member 62 is of the approximate thickness of the rear plate 20 and has secured thereto, as clearly shown in Figure 17, the depending plate 63 adapted to pass over the outer face of the rear plate 20 and provided with the serrations 64 in the lower edge thereof. Loosely pivoted as at 65 to the outer face of this plate 63 is the dog or trip member 66 provided with the cam surface 67 and control spring 68, said dog adapted to actuate an electric switch element 70 to be described later. On the same face of the member 63 is a wedging pin 71 secured as at 72 to said member. A pin 73 is mounted on the opposite face of the member 63 and is adapted to operate the coin release bar 74 also to be described later.

Figure 5:
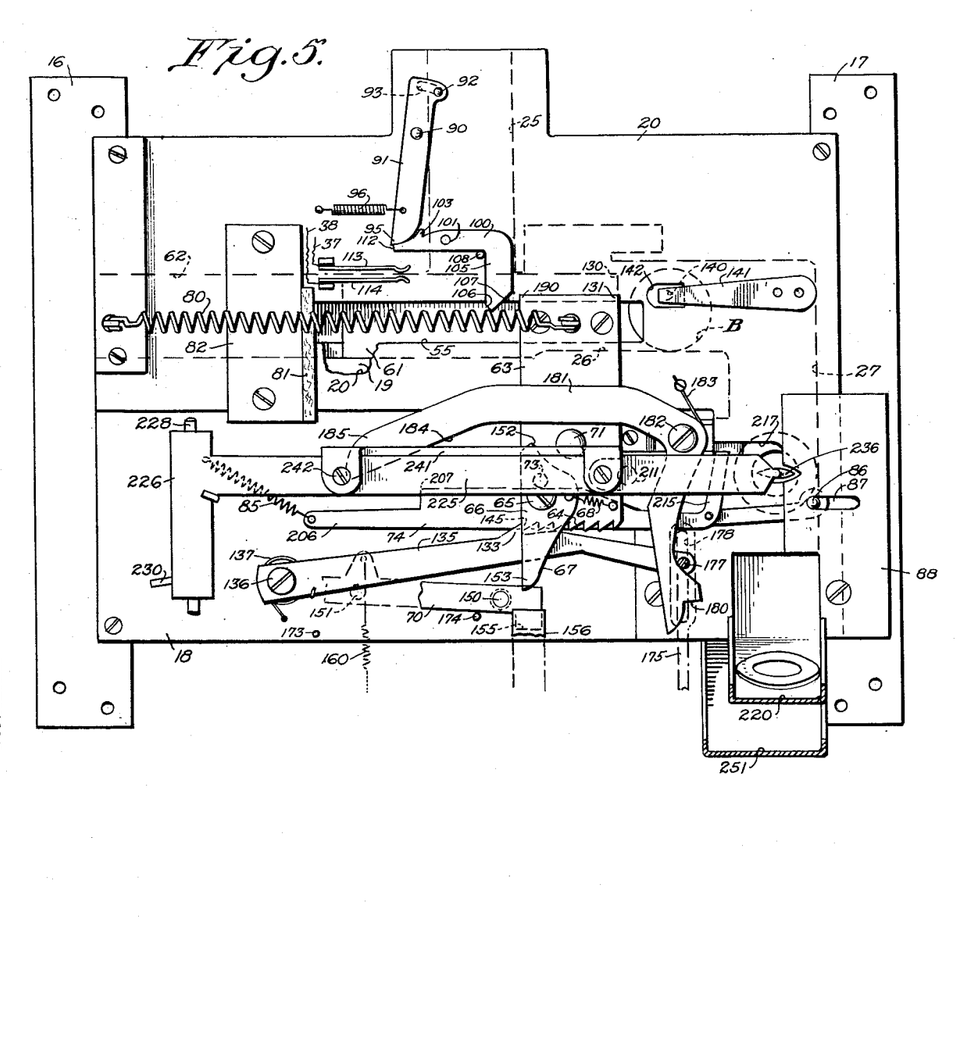
Figure 5 is a view similar to Figure 4 showing the arrangements of parts after a coin has been inserted and the vending mechanism started.

Referring to Figure 4 which illustrates the normal position of the parts of this mechanism, or the arrangment of parts prior to the insertion of a coin, it will be seen that the operating slide controlled as by the spring 80 is in its extreme left hand position as seen in said figure. That is to say, the position of the said slide is determined in one direction by the depending plate 63 contacting with the bumper 81 of any suitable soft material such as leather secured to the rear plate 20 as by the holding plate 82, thereby insuring a cushioning or shock absorbing effect upon the member 63 when the same is released from such a position as shown in Figure 5 and spring-returned to its normal position.

Figure 10:
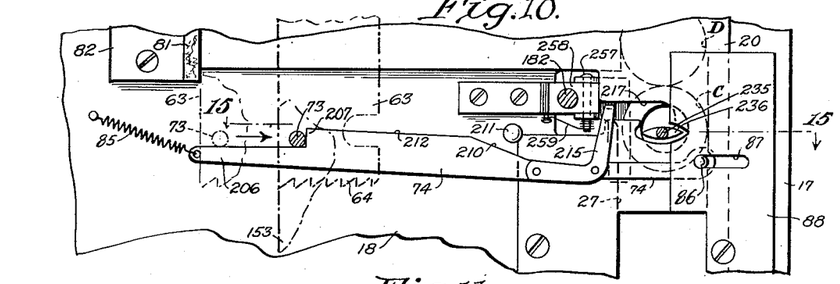
Figure 10 is a fragmentary rear elevational view of the coin releasing mechanism associated with this device.
Figure 14:
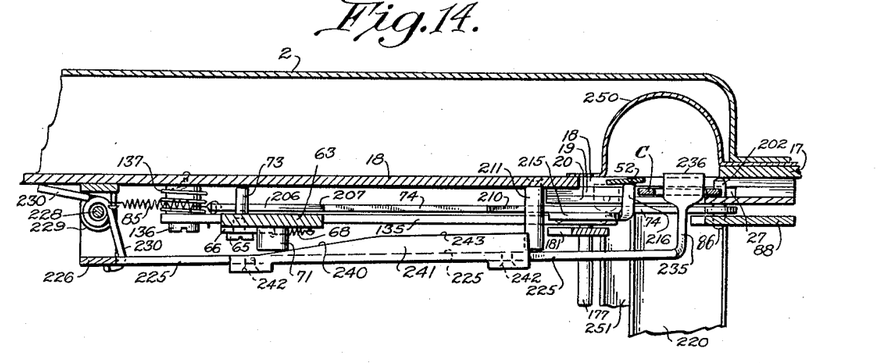
Figure 14 is a sectional view taken on the line 14—14 of Figure 4 and looking in the direction of the arrows.
Figure 15:
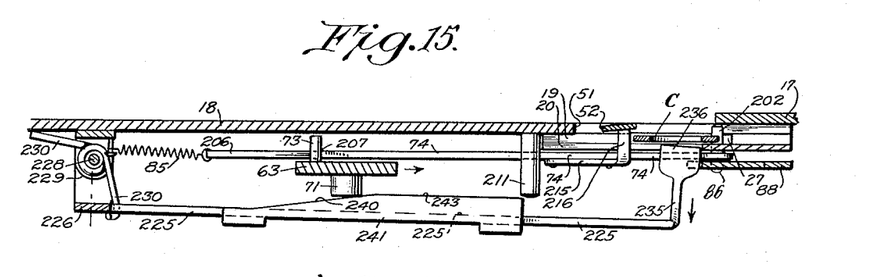
Figure 15 is a sectional view taken on the line 15—15 of Figure 10 looking in the direction of the arrows and illustrating the parts shown in Figure 14 in an advanced step of operation.

When the parts are in their normal position or such positions as indicated in Figures 4, 10 and 14 it will be observed that besides the member 63 being in an extreme left hand position as seen in Figure 4, the coin releasing bar 74 is likewise in its extreme left hand position, being held in such position by its spring 85 and the rear end 86 of the pin, passing through and carried at the opposite end of said bar, being in the left hand end of the slot 87 provided in the plate 88 rigidly secured to the rear plate 20 of the mechanism. Also the electric switch element 70 is in open position as shown.

Pivoted as at 90 to the rear plate 20 is the lever 91 provided at one end with the pin 92 working in the slot 93 provided in the rear plate 20. The other end of the lever 91 is provided with a cam surface 94 so disposed as to provide the latching point 95 at the extreme end of said lever 91. A spring 96 normally holds the lever 91 in such position that the pin 92 extending through the slot 93 and into the coin chute 25, will lie in the path of a coin such as indicated in Figure 4 at A. Coacting with the latching lever 91 is the trip device 100 pivoted to the rear plate 20 as at 101 and provided at one end with the cam surface 102 adapted to contact the cam surface 94 of the latching lever 91. A tooth 103 at the end of the cam surface 102 serves to catch the point 95 of the lever 91 and hold the same behind said tooth in the position clearly indicated in Figure 8 after the coin indicated at A in Figure 4 has been forced past the pin 92 of the latching lever 91. The other end of the tripping device 100 is so constructed as to be heavier in weight than the end provided with the cam surface 102, and comprises a downwardly extending portion 105 whose extreme lower end is provided with the oppositely disposed inclined or cam surfaces 106 and 107. A stop pin 108 limits the movement of the tripping device 100 as clearly indicated in the drawings.

From the foregoing it will now be clear that when a coin as indicated at A in Figure 4 is inserted in the device the advancing edge 110 of said coin will force the pin 92 to the left as seen in said figure whereby the cam surface 94 and point 95 of the latch 91 will be moved to the right as seen in said figure, and the parts are so dimensioned that in order for the coin A to completely pass the pin 92 the point 95 of the pivoted latch 91 will pass the tooth 103 of the tripping device 100. When this happens the tooth 103 will hold the point 95 of the latch because of the weight of the heavier end 105 of the tripping device 100, and coin A will drop down the chute 25 to the bottom thereof. In the movement just described it will be clear from Figures 4 and 8 that the point 112 of the tripping device 100 in its downward movement will force the electrical contact finger 113 against its companion electrical contact finger 114 thereby allowing current from the battery or other source 36 to flow over the wire 37 to and through the electromagnets 35, see Figures 21, 23 and 24, and thence over the wire 38 to the contact finger 114 thence through the contact finger 113, to and over the wire 37 back to the source 36 thereby energizing said magnets. The magnets 35 will be constantly energized so long as the fingers 113 and 114 are in contact. Therefore it will be evident from the drawings that if instead of the required coin being inserted in the mechanism an iron, steel or other magnetic disk be inserted of the same diameter and thickness as the coin, it will first in its passage down the chute 25 operate the latch 91 which will in turn operate the switch device 100 and close the electric circuit through the fingers 113 and 114 and the electromagnets 35. The magnets 35 will thus be energized before the iron disk reaches them and therefore with special reference to Figure 24 it will be seen that the magnets 35 will attract the advancing disk thereto so that the bottom edge 120 thereof will be pulled from the slot 25 and over the inclined bottom edge 31 of the aperture 30 in the front plate 18 of the mechanism. Consequently when the magnets 35 are subsequently de-energized the iron disk will be released and allowed to drop outside of the mechanism and into the space between the front cover plate 2 and the mechanism, and fall through the slot 6 in the bottom of the said cover plate 2 into full view of any person observing the vending machine. Thus it will be seen that a coin or authorized check such as commonly used with such vending machines and of non-magnetic quality, is required to actuate the mechanism.

Figures 6, 7, 8, 9:
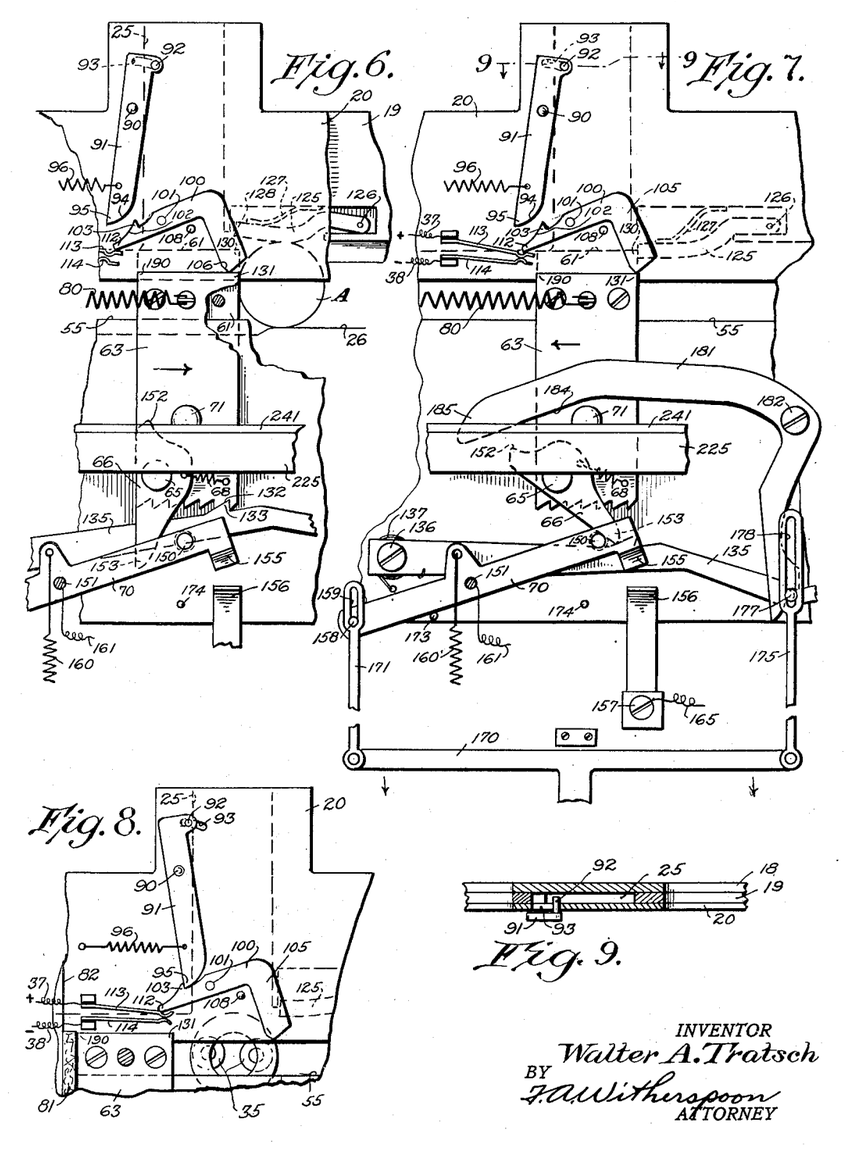
Figure 6 is a fragmentary detail view of some of the parts shown in Figure 4 after a coin has been inserted and the coin actuating slide started on its forward movement.
Figure 7 is a view similar to Figure 6 but illustrating a step in the return movement of the coin actuating slide.
Figure 8 is a fragmentary detail view of the coin actuated switch elements controlling the magnets associated with this invention.
Figure 9 is a sectional view taken on the line 9—9 of Figure 7 and looking in the direction of the arrows.

In the cross coin passage 26, see Figure 4, is located a locking lever 125 pivoted as at 126 and forced as by the spring 127 to such position that its free end 128 would stop any movement of the member 61 to operative position before the insertion of a coin into the device. In Figure 7 this is clearly demonstrated wherein it will be observed that the upper advancing corner 130 of the member 61 would strike the end 128 of the locking lever 125. However, upon the insertion of an authorized coin such as indicated at A in Figures 4 and 6 it will be observed that the advancing member 61 will act against the coin A and in the continued movement of said slide the advancing arcuate edge of the said coin will strike the end 128 of the locking lever 125 and force the same upwardly all as will be clearly understood so that both the coin A and the member 61 will pass underneath the end of the locking lever thus allowing the further operation of the mechanism. From Figure 6 it will be observed that during this same operation the advancing corner 131 of the member 63 associated with said member 61 will act against the inclined surface 106 of the trip device 100, swing the same about its pivot 101 and thus release the point or toe 95 from its held position back of the tooth 103, whereupon the spring 96 will move the latch 91 so that the pin 92 thereof will be reset in the coin chute and in the path of a subsequently inserted coin. When the parts are in the positions shown in Figure 6, it will be observed that the point 130 of the slide 61 will just pass underneath and beyond the extremity 128 of the locking lever 125. Also it will be observed that at this time the first notch 132 of the serrations 64 will be engaged by the tooth 133 carried by the holding or full stroke compelling bar 135 pivoted as at 136 to the frame work of the mechanism and controlled as by the spring 137.

Further and continued movement of the member 61 will cause the member 63 associated therewith to move in the direction of the arrows, see Figure 6, thus propelling the coin A along the coin passageway 26 until the member 63 is in its extreme right hand position as seen in Figure 5 when it will be observed that the coin A will be in the position indicated at B and frictionally engaged by the pointed end 140 of the spring 141, said point extending through a suitable aperture 142 in the rear plate 20 of the framework. Also it will be observed in Figure 5 that the tooth 133 of the full stroke compelling bar 135 will have successively engaged all the serrations 64 of the said member 63 and subsequently engaged the last serration 145 thereof. The member 63 will then be held in this position by the tooth 133 until the bar 135 is lowered so that the tooth 133 will release the member 63. This operation will be disclosed later.

As the member 63 moves from its left hand position shown in Figure 4 to its right hand position shown in Figure 5 the trip member 66 being pivoted thereto will have passed the pin 150 secured near one end of the electric switch element 70 pivotally secured as at 151 to the frame of the mechanism. In so passing, however, it will be seen from Figures 4, 5, 6 and 7 that prior to the passing of a coin into the chute 25 the switch element 70 will be in open circuit position as specifically shown in Figures 4, 6 and 7. As the members 63, however, is advanced as previously described the trip member 66 will contact the pin 150 and the cam surface 67 will ride on said pin freely until the heel 152 of said trip member contacts with the pin 71 carried by said member 63, when no further movement being possible, the toe 153 of said trip member will force the pin 150 of the switch element 70 downwardly and in order to clear the same will force the said pin 150 downwardly to such position as will cause the depending blade 155 of the switch element 70 to electrically contact with the companion blade 156 secured as at 157 to any part of the piano or other vending structure. The electric switch element 70 will be retained in this downward contacting position by virtue of the vertically disposed spring 160 working first on one side and then the other of the dead center passing through the pivot 151 of said switch element 70 all as will be clear from the drawings. The bringing into contact of the blades 155 and 156 will close an electric circuit and set in operation the piano or other vending mechanism. Such a circuit is diagrammatically illustrated in Figure 4 wherein it will be seen that the circuit comprises the blade 155, switch element 70, pivot 151, wire 161, motor 162, wire 163, battery or other source of current 164, wire 165, screw 157 and blade 156.

Upon the completion of the music played by said piano, or upon the completion of the vending operation, mechanical means controlled as by the motor 162, not shown in the drawings but being well understood, will cause the bar 170 and the link 171 pivoted thereto as at 172 to move downwardly. The pin 158 disposed at the end of the switch element 70 opposite to the blade 155 and occupying the upper end of the slot 159 when said blade is in contact with the companion blade 156, will thereupon be moved downwardly with said link 171, whereupon the blades 155 and 156 will be disengaged. Stop pins 173 and 174 limit the degree of oscillation of the spring controlled switch element 70.

Also the downward movement of the bar 170, see Figures 4 and 5, will likewise move downwardly the link 175 pivoted to said bar as at 176. When this occurs the pin 177 disposed at the extremity of the complete stroke compelling bar 135 and in the slot 178 of said link 175, will be moved downwardly thereby releasing the member 63 and the member 61 from the tooth 133 of the full stroke compelling bar 135. The parts are so dimensioned and so timed that the downward movement of the link 175 will move the pin 177 associated therewith to such a position as shown in Figure 7. That is to say, the pin 177 will be moved downwardly to such a position as to cause said pin to be engaged by the shoulder 180 disposed at one end of a bent holding lever 181 pivoted as at 182 to the frame of the mechanism and controlled as by the spring 183. The pin 177 will be held by the shoulder 180 until released therefrom by the action of the pin 71 carried by the member 63 contacting the inclined edge 184 of the other end 185 of the bent holding lever 181. When said pin 71 contacts the inclined edge 184, the lever 181 will be oscillated about its pivot 182 against the action of the spring 183 in the well known manner. The holding lever 181 as will readily be seen from Figures 4, 5 and 7 is of sufficient dimension that after the release of the pin 177 from one end thereof the other end 185 will be kept in a position above the pin 71 carried by the slide member 63.

As the slide member 63 returns from its full operative position shown in Figure 5 to its normal position shown in Figure 4 the upper rear corner 190 thereof, see Figures 4, 5 and 7, will strike the inclined surface 107 of the end 105 of the tripping device 100. When this occurs the tripping device 100 being pivoted at 101 will oscillate and the end 105 will move upwardly to such a position as shown in Figure 7 thereby allowing the slide member 63 to pass beneath said tripping device and return to its normal position. This movement will again place the electrical contact blade 113 and 114 in such a position as to close electrical circuit through the electromagnets 35 and release the latch member 91 from said tripping device and again place the pin 92 carried by said latch in the coin receiving chute 25 if inadvertently a coin had been inserted in said chute prior to the return of the slide member 63 to the position shown in Figure 4. Of course as soon as said slide member reaches said last mentioned position, the electrical circuit through the members 113 and 114 will again be opened and the parts will be in the position illustrated in Figure 4.

Exactly the same operation will take place as heretofore disclosed upon the insertion of a subsequent coin or check. That is to say, upon the insertion of the next coin it will pass to the bottom of the receiving chute 25, the operating slide will be moved as heretofore described, whereupon the electromagnets 35 will be energized, the new coin will lift the locking latch 125 allowing the forwardly moving corner 130 of said slide to pass beneath said locking latch all as heretofore described and then the new coin will contact with the previously inserted coin which at the end of the operation above disclosed occupies such a position as indicated at B in Figure 5. When this occurs the previously inserted coin will be pushed forward over the end of the passageway 26 and will pass into the coin discharging chute 27.

Figure 11:
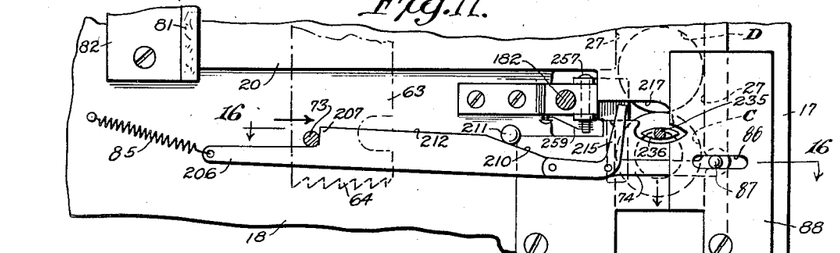
Figure 11 is a view similar to Figure 10 showing the parts illustrated in Figure 10 in an advanced step of operation.
Figure 12:
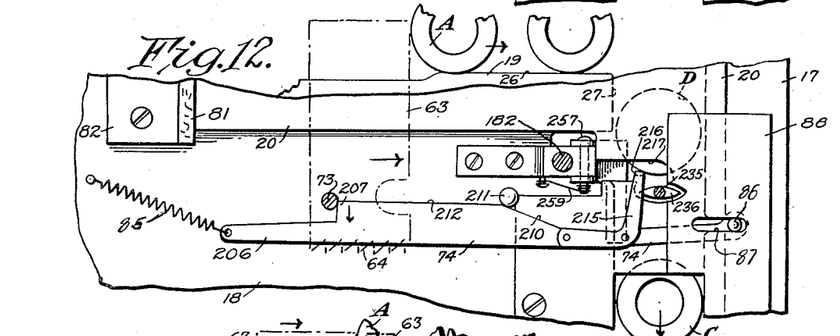
Figure 12 is a view similar to Figures 10 and 11 illustrating the parts in a still further step of the operation.
Figure 13:
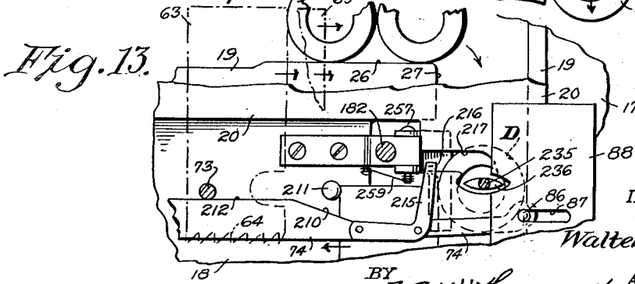
Figure 13 is a detail view similar to Figures 10, 11 and 12 illustrating the parts shown therein in still a different position.
Figure 16:
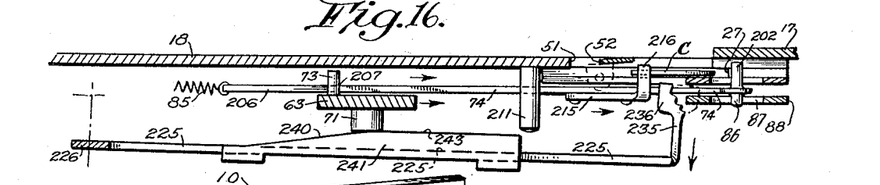
Figure 16 is a sectional view taken on the line 16—16 of Figure 11 looking in the direction of the arrows and illustrating the parts shown in Figures 14 and 15 in a still further step of the operation.

With special reference to Figures 4, 5, 10, 11, 12 and 13, it will be observed that the pin 73 extending inwardly and carried by the slide member 63 will cause the coin releasing bar 74 to move to the right as seen in said figures. That is to say, as will be seen in the drawings the coin releasing bar 74 is provided at one end with a pin 86 adapted to work in a slot 87 provided in the rear frame of the mechanism. This pin as is clearly shown in Figure 16 has a portion 202 extending forwardly of said bar which is adapted to act as a stop for the coins passing down the delivery chute 27. As will be seen in Figure 10 the bar 74 is controlled as by the spring 85 so that when the pin 73 is in the position shown in dotted lines in said figure the rearward portion 206 of said bar will be in contact with the pin 73 and on the under side thereof. At this same time the pin 86 at the opposite end of said bar is in the extreme left hand end of the slot 87 as seen in said Figure 10, and the front extension 202 of said pin, see Figure 14, is in a position across the coin delivery chute 27. With the parts in these positions the first inserted coin will pass down the chute 27 but will be stopped by the projecting pin 202 so that said coin will assume a position indicated at C in Figure 10, that is, with one lower portion of its rim resting on the pin 202 and the substantially opposite edge jammed against the inner side of the chute 27. Upon the forward movement of the slide member 63, the pin 73 carried thereby will slide over the rear portion 206 of the bar 74 and occupy the position shown in full lines in Figure 10 wherein it will be noted that the said pin has contacted with the upstanding shoulder 207 of said bar 74. Upon further movement of the slide member 63 as indicated in Figure 11 by the arrow the pin 73 will cause the forward movement of the bar 74 against the action of the spring 85 by virtue of the fact that said pin abuts the shoulder 207 thereof. When the bar 74 moves to the right as seen in Figures 10, 11 and 12, the pin 86 and its extending portions 202 will likewise move until said pin 86 occupies the other extreme end of the slot 87.

However, before said pin 86 occupies the extreme right end of the slot 87 as seen in said Figures 10, 11 and 12, the inclined surface 210 of said bar 74 will contact with the pin 211 rigidly secured to the rear frame of the mechanism as clearly shown in Figure 11. As the pin 73 continues to move the bar 74 to the right, said bar will be forced downwardly by virtue of the pin 211 thus oscillating said bar about the pin 86 as a center. Upon the further movement of the slide member 63 and its pin 73, the bar 74 will be forced downwardly by said pin 211 until the latter leaves the inclined surface 210 and rides the top surface 212 of said bar, see Figures 12 and 13. When this occurs it will be observed that the pin 73 will have cleared the top of the shoulder 207 of the bar 74 and will thereafter ride over the top surface 212 of said bar. But so long as the pin 73 in its movement contacted with the shoulder 207, the pin 86 carried by the bar 74 would likewise continue moving to the right and the slot 87 is of such dimension that the said pin 86 would just reach the extreme right end thereof as the pin 73 cleared the shoulder 207. As soon as extension 202 of the pin 86 moves sufficiently to the right to clear the discharge chute 27, the coin such as indicated in the position C in Figure 10 would be allowed to drop and pass out of said chute. As soon as the pin 73 clears the shoulder 207 of the bar 74 it will be clear from the drawings that the spring 85 will return said bar 74 to its normal holding position as clearly shown in Figures 10 and 14. Should by chance any subsequently inserted coins reach such a position as indicated at D in Figures 10, 11 and 12, the following would happen: The bar 74 has rigidly secured to the rear side thereof an elbow provided with an upwardly extending arm 215 the upper end of which as clearly shown in Figures 10 to 16 is bent forwardly substantially at right angles to form a holding finger 216 projecting through the slot 217 and adapted to extend across the discharge chute 27 in a horizontal plane above the plane of the pin 202. The horizontally disposed portion of this elbow provides a stop for the end of the holding bar 135 as indicated at 138. It will be clear from the drawings that as soon as the pin 202 carried by said bar 74 moves out of the coin chute 27, the finger 216 moves into said chute from the other side thereof. Thus as the coin indicated at C in Figure 11 is released and begins its downward drop out of the chute 27 the finger 216 comes into said chute and takes the position under the next following coin indicated at D thus preventing said coin, as clearly shown in Figure 12, from passing out of the chute 27 at the same time as coin C. Upon the return of the bar 74 to the left as seen in the drawings the coin D is released by the upper finger 216 but caught by the pin 202 lower down on the opposite side of the said chute, thus assuming a position indicated at D in Figure 13.

From the foregoing it will now be clear that when a true coin is inserted in the receiving chute 25 and as indicated at A in Figure 4, the electromagnets 35 are energized through the closing of the switch elements 113 and 114 through the medium of the trip device 100. If instead of a coin, a slug be inserted, then the energized magnet 35 will withdraw the slug from the bottom of the chute 25 as clearly shown in Figure 24, and said slug will ultimately be dropped entirely out of the coin controlled mechanism into the interior of the cover plate 2 and out therefrom through the slot 6 in the bottom thereof as clearly shown in Figures 21 and 23. On the other hand, if a true coin is inserted the same will pass to the bottom of the receiving chute 25 there to be operated upon by the slide 61 with its depending member 63, and pushed along the passage 26. In so travelling the coin will lift the locking latch 125 and hold the same in raised position sufficiently to allow the advancing slide 61 to pass therebeneath. When the slide 61 is moving to the right as seen in Figure 4 the serrations 64 carried at the bottom of the slide member 63 will be successively engaged by the tooth 133 carried by the full stroke compelling bar 135. Therefore, when the slide member 63 reaches such a position as indicated in Figure 5 it will be retained by said tooth 133 as clearly shown.

In the meantime the pivoted dog 66 carried by said slide member 63 will have wiped over the pin 150 carried by the pivoted switch element 70, forcing the said pin downwardly so as to bring about the electrical connection between the blade 155 associated therewith and the blade 156 stationary with respect to the pivoted member 70. This closes electrical connection through a motor such as indicated at 162 thus setting in operation the vending mechanism. Upon the completion of the vending operation the bar 170, see Figure 4, will be depressed and the links 171 and 175 will be pulled downwardly. In this movement the link 171 will pull downwardly the pin 158 carried at the opposite end of the electric switch element 70 and thus open the electric circuit through the vending operating motor 162. This, however, raises the pin 150 carried at the other end of said member 70. Upon the downward movement of the other link 175 the pin 177 coacting therewith will be lowered, see Figures 5 and 7. The downward movement of the pin 177 as will readily be seen swings the complete stroke compelling bar 135 about its pivot 136 and in so doing releases the tooth 133 from its holding position with relation to the serrations 64 carried by the slide member 63. Upon this disengagement, the spring 80 will cause the slide member 63 to return to its normal position as indicated in Figure 4. In this movement, however, the dog 66 carried thereby will wipe over the pin 150 of the switch element 70 in the opposite direction, but there being no pin such as 71 to obstruct the turning of the dog about its pivot during this movement, said dog will freely slide over the said pin 150 without forcing the pin 150 downwardly so as to cause a re-engagement of the switch blades 155 and 156 controlling the circuit through the vending operating motor 162. This movement of the slide member 63 and the dog 66 is clearly illustrated in Figure 7.

The remaining operation accomplished by the above mentioned movement is the release of the previously inserted coin from its held position as indicated at C, see Figure 10, down the delivery chute 27 into the trough 220, see Figures 4, 5, 14 and 22, into any suitable collecting means 221, all as clearly described above.

In a great many instances it is desirable to operate vending mechanism not only by the insertion of a real coin but with what are termed trade checks which as is well known are cheaply constructed disks of the same diameter and thickness as the real coin intended to operate the mechanism, but having the central portion thereof apertured so that the trade check may the more easily be detected from a real coin. Another purpose in using trade checks in said mechanism is to compel the use of the trade check at the place where obtained in view of the fact that said trade checks are not acceptable as real coins in other places.

This invention is adapted therefore to the use of both real coins and trade checks. But it has been discovered that mechanisms utilizing both checks and coins present the difficulty of having to have the disks taken in by the machine segregated into coins and checks. This device automatically separates the coins and checks, allowing the checks to pass into one receptacle and the coins to be passed into another receptacle.

The mechanism for accomplishing this separation of disks is fully disclosed in Figures 1, 4, 14, 15, 16, 17, 18, 19 and 22. In these figures it will be observed that there is provided a coin selector bar 225 provided with a hinge end 226 having the extension 227 and adapted to be hung in substantially horizontal position on the pivot pin 228 passing through the ears 229 rigidly secured to the frame of the coin controlled apparatus. A heavy duty spring 230 is interposed as shown between the said frame and the bar 225 so as to normally hold said bar in the position shown in Figure 14. The other end of this bar 225 is bent substantially at right angles to said bar providing the extension 235 which is adapted in its normal position to extend through the coin delivery chute 27. The extreme end of this extension 235 is flattened to provide the head 236 of a dimension in the horizontal plane a trifle less than the diameter of the aperture in the trade checks adapted to be used with this particular vending mechanism, or other machines associated therewith.

When the slide member 63 starts on its movement to the right as seen in the figures the pin 71 carried thereby will contact with the inclined surface 240 of a slide member 241 mounted on said bar 225 and secured in adjustable relation thereto as by the screws 242. Upon the further movement to the right of said member 63 the pin 71 carried thereby will force the bar 225 to oscillate about its pivot 228 due to said incline 240, see Figure 15. This swing of the bar 225 reaches its limit when the pin 71, see Figure 16, reaches the surface 243 of the adjustable slide 241, and which said surface is substantially parallel to the said bar 225.

At this time as will be clear from the drawings the flattened head 236 carried at the end of the bar 225 has been moved in the direction of the arrows entirely out of the delivery chute 27, leaving the latter unobstructed. As heretofore disclosed during this advance movement of the slide member 63, and the unobstructing of the chute 27 by the coin selecting head 236 the finger 216 carried by the member 215 mounted on the check controlling bar 74 is likewise advanced, see Figures 10, 11 and 12, thus allowing the trade check indicated at C in said last mentioned figures to continue its travel down the chute 27 and into the trade check receptacle 221, see Figure 22. At the same time the next advancing disk such as indicated at D in said Figures 10 to 12 is prevented from dropping into a position opposite the path of the coin selector head 236. The controlling bar 74 is released during the continued advance of the slide member 63, see Figure 13, whereupon the finger 216 retracts from across the chute 27 and allows the disk indicated at D to assume the position shown at C.

When the vending operation is completed, and the slide member 63 is released from its held position indicated in Figure 5 by the tooth 133 of the complete stroke compelling bar 135, said member 63 will fly back to its normal position as shown in Figure 4 by reason of the action of the spring 80. However, in this movement the pin 71 carried by said member 63 will retrace the path it took before and thereupon allow the coin selector bar 225 to resume its normal position, or that position such as indicated in Figure 14 due to the action of the spring 230. If the disk such as indicated at D in Figures 10, 11 and 12, is another trade check, then the head 236 will pass through the aperture of said check when said check has been released and held in such a position as indicated at C in Figure 10 and therefore said check will not be disturbed.

On the other hand, if the disk indicated at position D in said figures is a real coin, the following operation will take place. Upon the movement of the slide member 63 the coin selector bar 225 will be swung outwardly and the head 236 associated therewith will be withdrawn from its obstructive position across the delivery chute 27, assuming the position shown in Figure 16. Upon the release of the spring-held slide member 63, the same will fly back to its normal position, thus releasing the selector bar 225 from its outwardly swung position, whereupon said bar will, under the action of its spring 230, seek to assume its normal position shown in Figure 14, all as heretofore described. The disk that now lies in the position illustrated at C being a real coin, there is no aperture for the head 236 to pass through, and therefore the said head pushes the real coin, indicated at C in Figures 18 and 19, out through the front side of the coin delivery chute 27 into the cylindrical casing 250 secured to the frame of the apparatus and disposed within the cover plate 2 thereof, escaping from said casing by means of the trough 251 leading to the coin receptacle 252, see Figure 22. In this movement, and with particular reference to Figures 3, 18, 19 and 22, the real coin is held in the plane of the chute 27 on one side of said coin by the overhanging edge portion 255 of the front plate 18 of the apparatus and on the other side by the edge 256 of the gate 52 mounted within the aperture 51 in said front plate, pivoted as at 257 to the extension 258 of the frame, and controlled as by the spring 259.

Inasmuch as trade checks are issued by proprietors of different amusement resorts, etc., it has been found that all trade checks are not uniform as to the dimension of the internal aperture contained therein. That is to say, different trade checks will have apertures of different diameters. From the foregoing it will therefore be readily understood that coin selector bars 225 may be manufactured, each provided with a flattened head 236 of different dimensions. In other words, the selector bar 225 may be obtained for use in the coin controlled apparatus above described, provided with a head 236 of a dimension which will allow trade checks having an aperture of a certain maximum diameter to pass into a receptacle such as 221 in Figure 22, and which will force real coins and trade checks provided with an aperture having a diameter less than the dimension of the head 236 into a different receptacle such as 252 in said figure.

It is obvious that those skilled in the art may vary the details of construction as well as the arrangements of parts without departing from the spirit of the invention, therefore it is not desired to be limited to the above disclosure except as may be demanded by the claims.

What is claimed is:

1. In a coin controlled apparatus adapted to actuate a vending mechanism the combination of a frame; a coin passage in said frame; a spring controlled slide operable in said passage in one direction to move a coin therein; means within said passage to prevent actuation of said slide without the aid of a coin; means carried by said frame to hold said slide when moved in one direction; a switch element pivoted to said frame and adapted to coact with a companion switch element; means on said slide to move said pivoted switch element into closed electrical contact with said companion element whereby said vending mechanism is actuated; means controlled by said vending mechanism to move said pivoted switch element out of electrical contact with its companion element whereby the actuation of said vending mechanism is stopped, as well as to release said holding means whereby said slide may move under spring action in the opposite direction; and means actuated by said slide to control the movement of the coins through said coin passage.

2. In a coin controlled apparatus adapted to actuate a vending mechanism the combination of a frame; a coin passage in said frame; a spring controlled slide operable in said passage in one direction to move a coin therein, said slide provided with a plurality of teeth disposed in the lower edge thereof; means within said passage to prevent actuation of said slide without the aid of a coin; means comprising a spring controlled pivoted bar carried by said frame and provided with a tooth adapted to engage the teeth of said slide to hold the same when moved in one direction; a switch element pivoted to said frame and adapted to coact with a companion switch element; means on said slide to move said pivoted switch element into closed electrical contact with said companion element whereby said vending mechanism is actuated; means controlled by said vending mechanism to move said pivoted switch element out of electrical contact with its companion element whereby the actuation of said vending mechanism is stopped, as well as to release said holding means whereby said slide may move under spring action in the opposite direction; and means actuated by said slide to control the movement of the coins through said coin passage.

3. In a coin controlled apparatus adapted to actuate a vending mechanism the combination of a frame; a coin passage in said frame; a spring controlled slide operable in said passage in one direction to move a coin therein; means within said passage to prevent actuation on said slide without the aid of a coin; means carried by said frame to hold said slide when moved in one direction; a spring controlled switch element pivoted to said frame and adapted to coact with a stationary companion switch element; means on said slide to move said pivoted switch element into closed electrical contact with said companion element whereby said vending mechanism is actuated; means comprising a bar and slotted links controlled by said vending mechanism to move said pivoted switch element out of electrical contact with its companion element whereby the actuation of said vending mechanism is stopped, as well as to release said holding means whereby said slide may move under spring action in the opposite direction; means to retain said holding means in disengaged position relative to said slide while the latter is travelling through a portion of its movement in said opposite direction; and means actuated by said slide to control the movement of the coins through said coin passage.

4. In a coin controlled apparatus adapted to actuate a vending mechanism the combination of a frame; a coin passage in said frame; a spring controlled slide operable in said passage in one direction to move a coin therein; means within said passage to prevent actuation of said slide without the aid of a coin; means carried by said frame to hold said slide when moved in one direction; a switch element provided with a pin and pivoted to said frame and adapted to coact with a companion switch element; means pivoted to said slide and coacting with said pin to move said pivoted switch element into closed electrical contact with said companion element whereby said vending mechanism is actuated; means controlled by said vending mechanism to move said pivoted switch element out of electrical contact with its companion element whereby the actuation of said vending mechanism is stopped, as well as to release said holding means whereby said slide may move under spring action in the opposite direction; pivoted means associated with said slide to retain said holding means in disengaged position relative to said slide while the latter is travelling through a portion of its movement in said opposite direction; and means actuated by said slide to control the movement of the coins through said coin passage.

5. In a coin controlled apparatus adapted to actuate a vending mechanism the combination of a frame; a coin passage in said frame; a spring controlled slide operable in said passage in one direction to move a coin therein; means within said passage to prevent actuation of said slide without the aid of a coin; means carried by said frame to hold said slide when moved in one direction; a switch element pivoted to said frame and adapted to coact with a companion switch element; means on said slide to move said pivoted switch element into closed electrical contact with said companion element whereby said vending mechanism is actuated; means controlled by said vending mechanism to move said pivoted switch element out of electrical contact with its companion element whereby the actuation of said vending mechanism is stopped, as well as to release said holding means whereby said slide may move under spring action in the opposite direction; means comprising a lever to retain said holding means in disengaged position relative to said slide while the latter is travelling through a portion of its movement in said opposite direction; and means actuated by said slide to control the movement of the coins through said coin passage.

6. In a coin controlled apparatus adapted to actuate a vending mechanism the combination of a frame; a passage in said frame for coins of different classes; a spring controlled slide operable in said passage in one direction to move a coin therein; means within said passage to prevent actuation of said slide without the aid of a coin; means carried by said frame to hold said slide when moved in one direction; a switch element pivoted to said frame and adapted to coact with a companion switch element; means on said slide to move said pivoted switch element into closed electrical contact with said companion element whereby said vending mechanism is actuated; means controlled by said vending mechanism to move said pivoted switch element out of electrical contact with its companion element whereby the actuation of said vending mechanism is stopped, as well as to release said holding means whereby said slide may move under spring action in the opposite direction; means comprising a lever associated with said slide to retain said holding means in disengaged position relative to said slide while the latter is travelling through a portion of its movement in said opposite direction; and means actuated by said slide to intercept each coin in said passage for automatic classifying thereof.

In testimony whereof I affix my signature.

WALTER A. TRATSCH.